O. C. KNIPE.
BALL BEARING.
APPLICATION FILED MAR. 27, 1911.

1,075,829.

Patented Oct. 14, 1913.

Witnesses
G. M. Copenhaver
Harry F. Rueth

Oliver C. Knipe
Inventor

UNITED STATES PATENT OFFICE.

OLIVER C. KNIPE, OF PALO ALTO, CALIFORNIA.

BALL-BEARING.

1,075,829.  Specification of Letters Patent.  Patented Oct. 14, 1913.

Application filed March 27, 1911. Serial No. 617,268.

*To all whom it may concern:*

Be it known that I, OLIVER C. KNIPE, a citizen of the United States, residing at Palo Alto, in the county of Santa Clara and State of California, temporarily residing in the District of Columbia, have invented certain new and useful Improvements in Ball-Bearings, of which the following is a specification.

This invention relates to improvements in antifriction bearings and appertains more particularly to ball and roller bearings which are made with two members formed with coincident annular grooves, and maintained in such relative position one to another that they form a raceway or track on which the balls or rollers can rotate, but from which they cannot be accidentally displaced. In practice it has been found necessary to harden these raceways to withstand the wearing action of the rotating members, but this was only possible by making the entire member of steel, and when so constructed the entire part was hardened. These parts then become brittle and are liable to break in assembling and when in service. Applicant's device differs from these in supplying a hardened raceway for the balls or rollers without hardening the members, and in providing for renewal of the hardened raceways, when worn, without removing the bearings or disturbing the alinement of the same. Lower cost of manufacture and other novel and useful features are fully brought forth in the specification.

The principal object of applicant's device consists in providing a hardened steel removable inserted lining for the raceways, and as designed supplies a simple durable low cost and effective device by the use of which the bearings may be made of any desirable metal as they do not require hardening.

A further object is the application to that form of bearings in which a hole or opening is provided for insertion and removal of balls or rollers from the raceway. The usual custom is to close this opening with a plug; but in applicant's device the opening is closed by an elastic lining strip one end of which closes normally over the opening, and the balls are introduced through the opening, one at a time, by depressing the end of the elastic liner.

Figure 1:
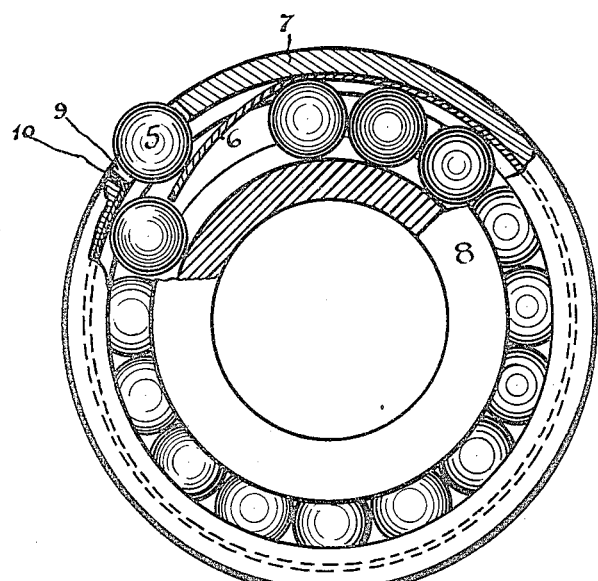
Figure 2:
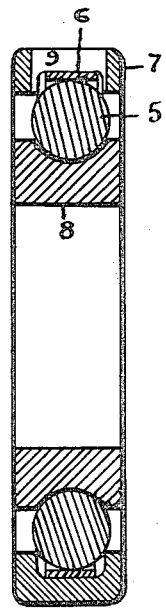
Figure 3:
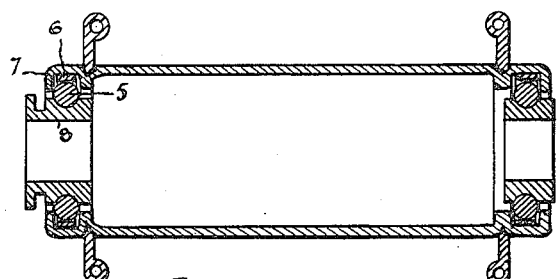
Figure 4:
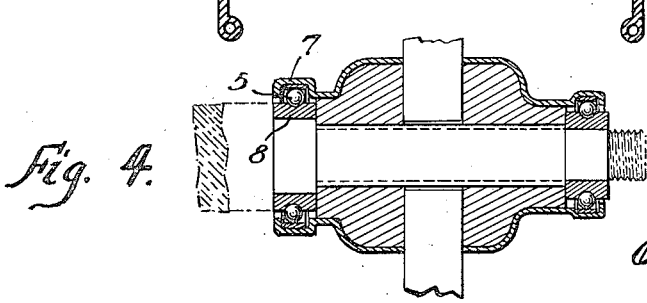

In the accompanying drawings Figure 1. is a side elevation (partly broken away) of a ball bearing with the elastic hardened liner which forms the object of this invention shown partly in section and the remainder indicated by dotted lines. Fig. 2. is a central vertical section through the same. Fig. 3. shows a central horizontal section through a bicycle hub showing the lining strip in position in bearings formed in the ends of the hub. Fig. 4. shows a central horizontal section through a wood hub having a metal shell band on each end, and with the ends of the bands formed into grooved raceways in which the strips (not shown) are applied in a similar manner to that shown in the other figures. It has not been deemed necessary to show the strip in Fig. 4. and the opening for insertion and removal of balls has been omitted from Figs. 3 and 4. to avoid complicated views and with the belief that Figs. 1. and 2. would clearly indicate this part of the construction.

In the preferred design of the bearing the outer member "7" has an annular groove formed in the periphery and the inner member "8" which is concentric with it has a coincident groove formed in the outer side of its periphery. The strip "6" of hardened steel is made to conform in shape with the bottom of the groove in the outer member and one end of the strip may have a stop or lug formed on it to set in a recess "10" made in the side of the opening "9" through which the balls are inserted.

In assembling the bearing the members are held on the same plane in concentric position the strip is inserted and the balls passed through the opening by depressing one end of the strip until the first ball inserted has moved around to a point where it interferes with the depression of the end of the elastic liner in the act of inserting another ball; it will be seen from this that while the entire raceway can not be entirely filled the act of leaving out one or two balls has been found to be advantageous in practice. We have now constructed a complete self-contained ball bearing in which one member can be stationary while the other revolves upon the balls or rollers, which in turn are held from displacement by the coincident grooves, and have a hardened removable raceway or track to rotate upon; said track also serving to close the opening through which the balls are inserted.

It will be apparent to those skilled in the art that a special form of bearing is non-essential in using the device, and that it can be applied to one or both of the grooves of the bearing.

Having described my invention, what I claim as new and desire to secure by Letters Patent is;—

1. A ball bearing provided with outer and inner concentric rings having raceways, a hardened elastic split steel ring adapted to spring inwardly for insertion of the balls and snugly fitting in one of said raceways, one of the raceways having an opening to admit balls, and a series of balls within the raceways.

2. A ball bearing provided with outer and inner concentric rings having raceways, a hardened elastic split steel ring adapted to spring inwardly for insertion of the balls snugly fitting in the outer raceway, one of said rings having an opening to admit balls, and a series of balls within the raceways.

3. A ball bearing comprising an outer ring having a raceway and having an opening to admit the balls, a split steel ring elastically seated in said raceway to permit insertion of balls and covering said opening, an inner ring having a raceway, and a series of balls within the raceway.

4. A ball bearing comprising a hub having a grooved end integral therewith, a grooved ring within the same, and means for insertion of the balls including a split ring on which the balls track, said split ring permitting insertion of the balls after assemblage of the rings.

5. A ball bearing having a wooden hub and shell band secured thereto, said band having a grooved end to form a raceway, an inner grooved ring with coöperating raceway, and a split steel ring covering an opening to admit insertion of balls and form a track therefor.

In testimony whereof I affix my signature, in the presence of two witnesses.

OLIVER C. KNIPE.

Witnesses:
 ARTHUR L. BRYANT,
 GEO. M. COPENHAVER.

---

Copies of this patent may be obtained for five cents each, by addressing the "Commissioner of Patents, Washington, D. C."